(12) United States Patent
Lin

(10) Patent No.: US 6,217,977 B1
(45) Date of Patent: Apr. 17, 2001

(54) GAS BLOW SHAPED AIR CUSHION WITH MULTIPLE CELLS

(76) Inventor: Li-Chieh Lin, 58, Ma Yuan West St., Taichung (TW)

( * ) Notice: Subject to any disclaimer, the term of this patent is extended or adjusted under 35 U.S.C. 154(b) by 0 days.

(21) Appl. No.: 09/264,364

(22) Filed: Mar. 8, 1999

(51) Int. Cl.[7] .................................................. B32B 3/12

(52) U.S. Cl. ........................................... 428/116; 264/261

(58) Field of Search .............................. 428/116; 264/261

(56) References Cited

FOREIGN PATENT DOCUMENTS

04255731 * 9/1992 (JP) .

* cited by examiner

*Primary Examiner*—Francis J. Lorin

(57) ABSTRACT

A gas blow shaped air cushion with multiple cells is disclosed. Wherein the air cushion is formed by gas blowing shaping, the gas blow shaped air cushion with multiple cells is formed by an air cushion with a plurality of independent cells. Each two cells are retained with a proper gap, by which as the air cushion is compressed due to movement, each of the cells has a proper space for elastic deformation. The gas blow shaped air cushion has a width thinner than that made by prior art mold injection and thus the weight of an air cushion is reduced and the air cushion becomes more useful.

2 Claims, 7 Drawing Sheets

GAS BLOW SHAPED AIR CUSHION WITH MULTIPLE CELLS

BACKGROUND OF THE INVENTION

1. Field of the Invention

The present invention relates to a gas blow shaped air cushion with multiple cells, when the air cushion is compressed due to movement, each of the cells has a proper space for elastic deformation.

2. Background of the Invention

In general, the air cushion on the bottom of a shoe is formed by mold injection, but the prior art injecting mold can not integrally form an air cushion with a plurality of hollow and independent cells. Thus, after injecting, the air cushion must be adhered with a plastic film on the surface of an air cushion with high frequency adhering. However, after compressed, the plastic film easily cracks so as to cause that the cell therewithin breaks. Moreover, the conventional air cushion made by injection mold is thicker, thus the softness and elasticity will be affected in moving and further the weight is increased. As a result, the conventional air cushion made by mold injection is heavier. This is a serious problem necessary to be improved.

SUMMARY OF THE INVENTION

Accordingly, the object of the present invention is to provide a gas blow shaped air cushion with multiple cells. The air cushion is formed by blowing air through an air inlet tube and a plurality of gas blow tubes with respect to each cell to insert into the mold cavities of the mold. A thermal flow channel is formed on the periphery of the air inlet tube for heating the air in the air inlet tube and the gas blow tube. Therefore, by the heat air in the gas blow tube, when the gas has been blown into the air cushion, the mouth for blowing air will be fused so as to be tightly sealed the hollow space in the air cushion. The gas blow shaped air cushion of the present invention has a width of only 0.8 mm~0.1 mm which is more thinner than the prior art mold injection and thus the weight of an air cushion is reduced.

Moreover, each two cells are retained with a proper gap, by which as the air cushion is compressed due to movement, each of the cells has a proper space for elastic deformation.

The present invention will be better understood and its numerous objects and advantages will become apparent to those skilled in the art by referencing to the following drawings in which:

DETAILED DESCRIPTION OF THE PREFERRED EMBODIMENT

The embodiment of the present invention will be described in the following. Those skilled in the art will understand the present invention from the following description and the appended drawings.

Figure 1:
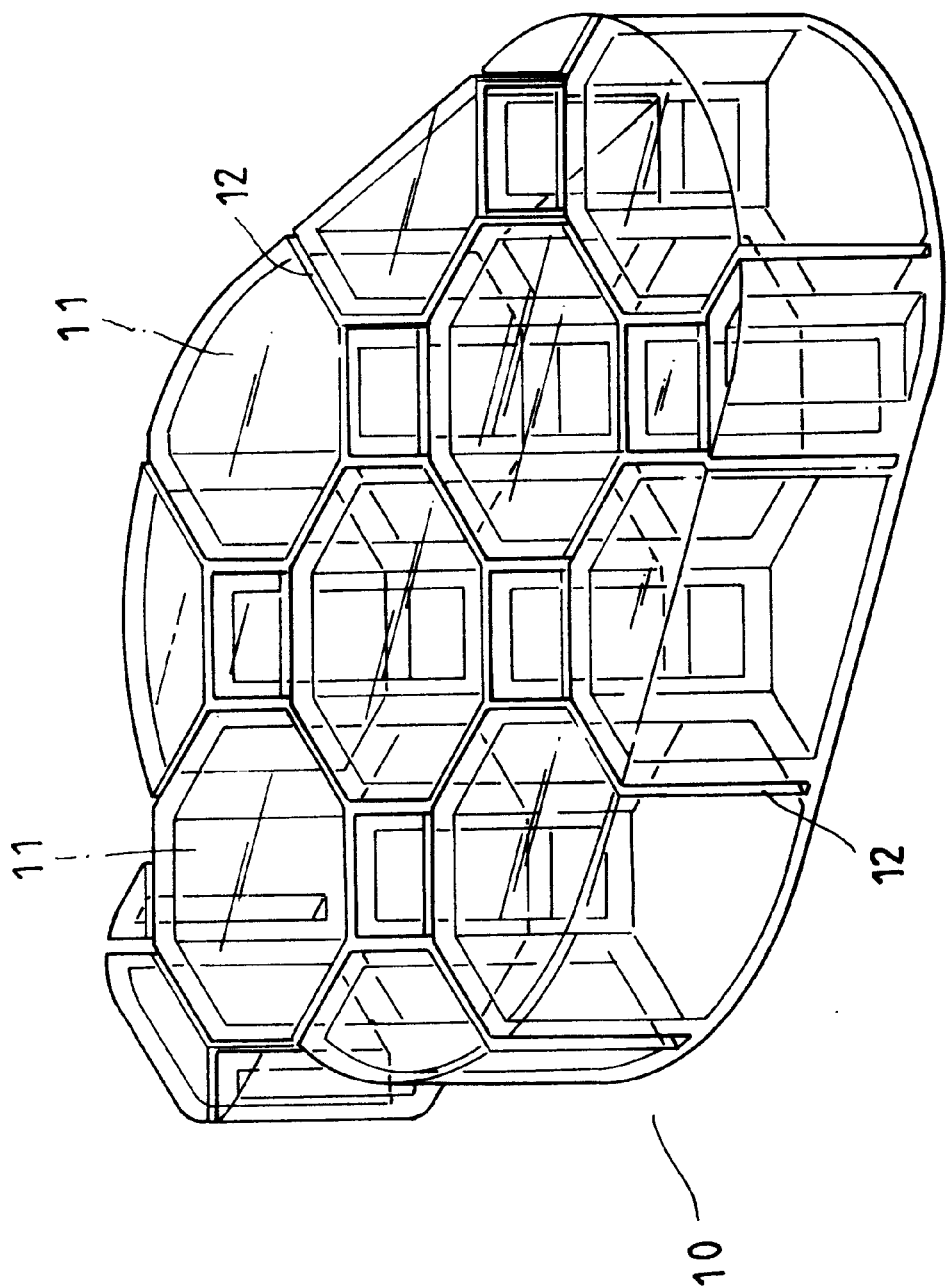
FIG. 1 is a perspective view of the air cushion of the present invention.
Figure 2:
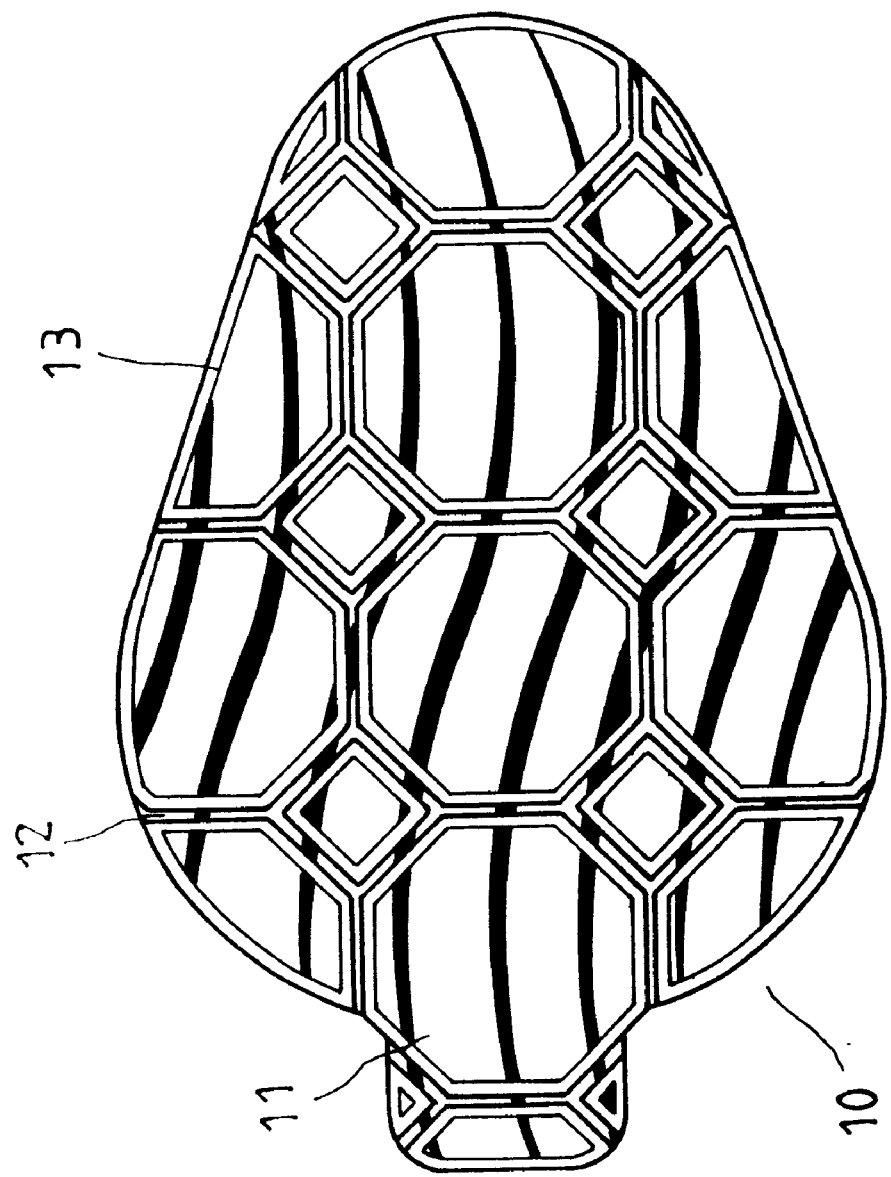
FIG. 2 is a plane view showing the application of the air cushion in the present invention.

With reference to FIG. 1, a perspective view of the gas blow shaped air cushion with multiple cells of the present invention is illustrated. The structure of the present invention is primarily formed by an air cushion (1) with a plurality of independent cells (11), each two cells are retained with a gap (12), by which as the air cushion (10) is compressed due to movement, each of the cells has a spacing for elastic deformation. Moreover, referring now to FIG. 3. the plane view showing the application of the present invention is illustrated. In order to increasing the beautiful sense in the air cushion (10), a plastic film (13) with a layer of beautiful colored texture can be adhered to the surface of the air cushion (10) by high frequency finishing so as to increase the outer appearance of the air cushion to be adhered to a shoe.

Figure 3:
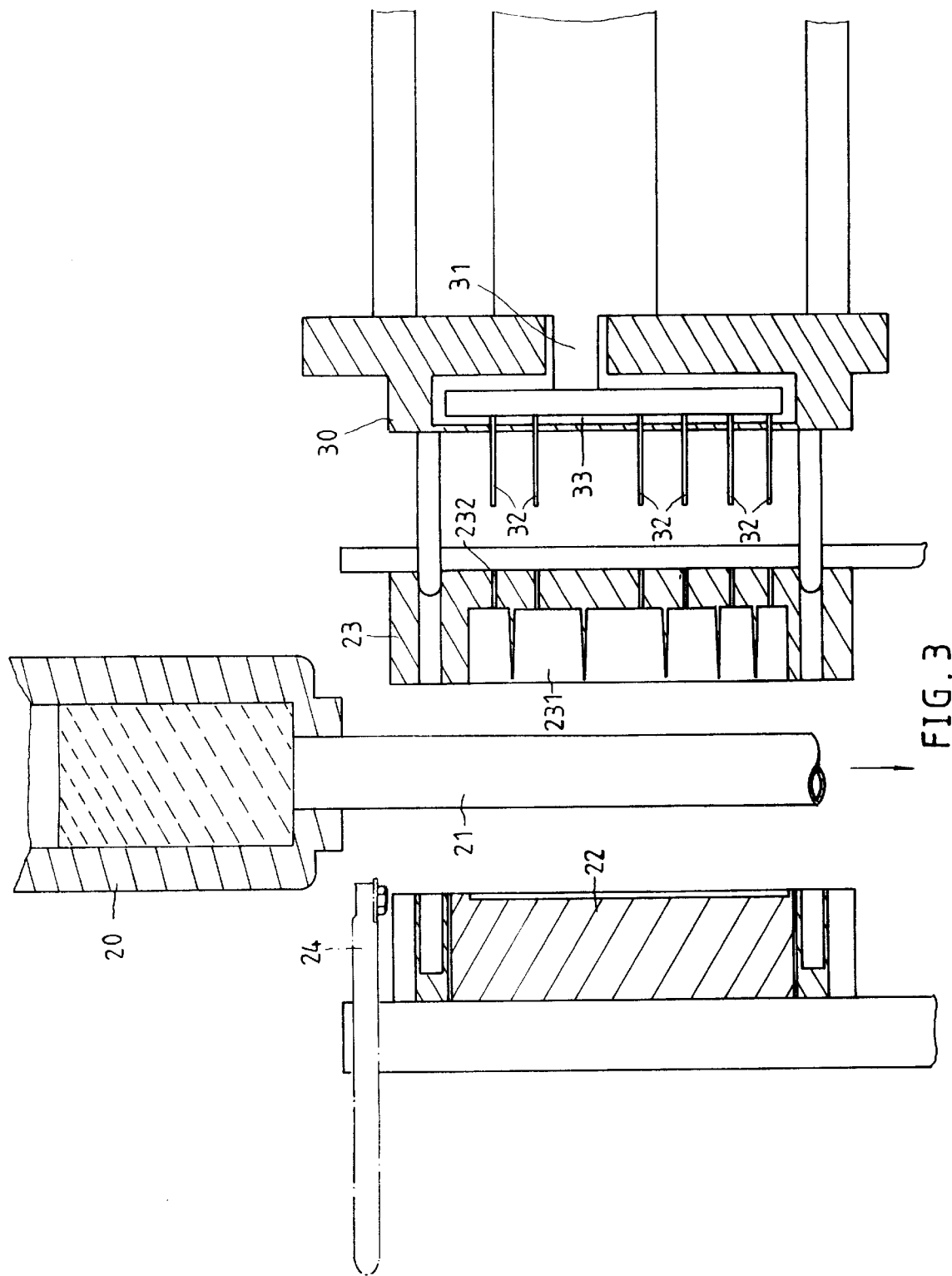
FIG. 3 shows the first process of manufacturing the present invention.
Figure 4:
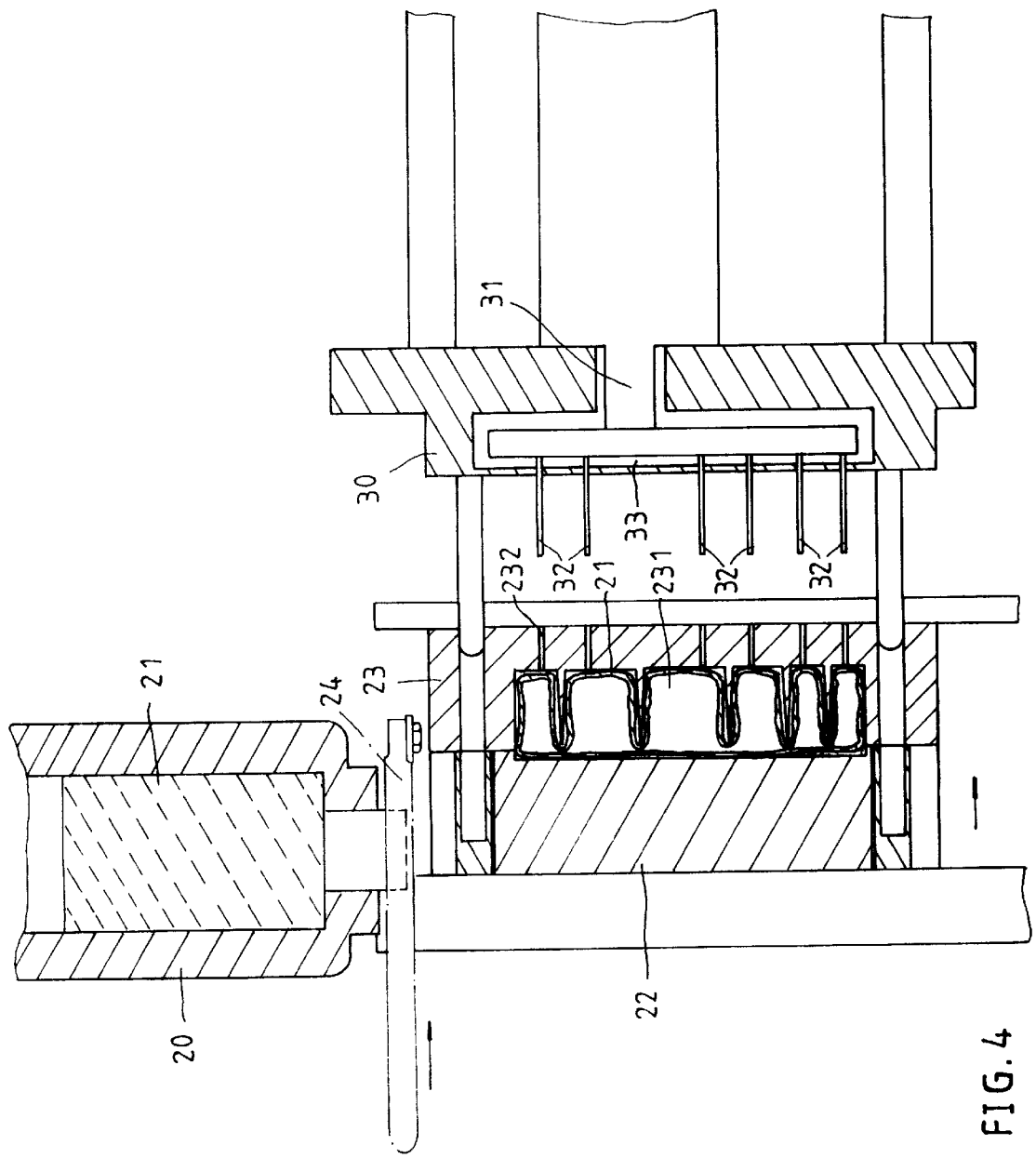
FIG. 4 shows the second process of manufacturing the present invention.
Figure 5:
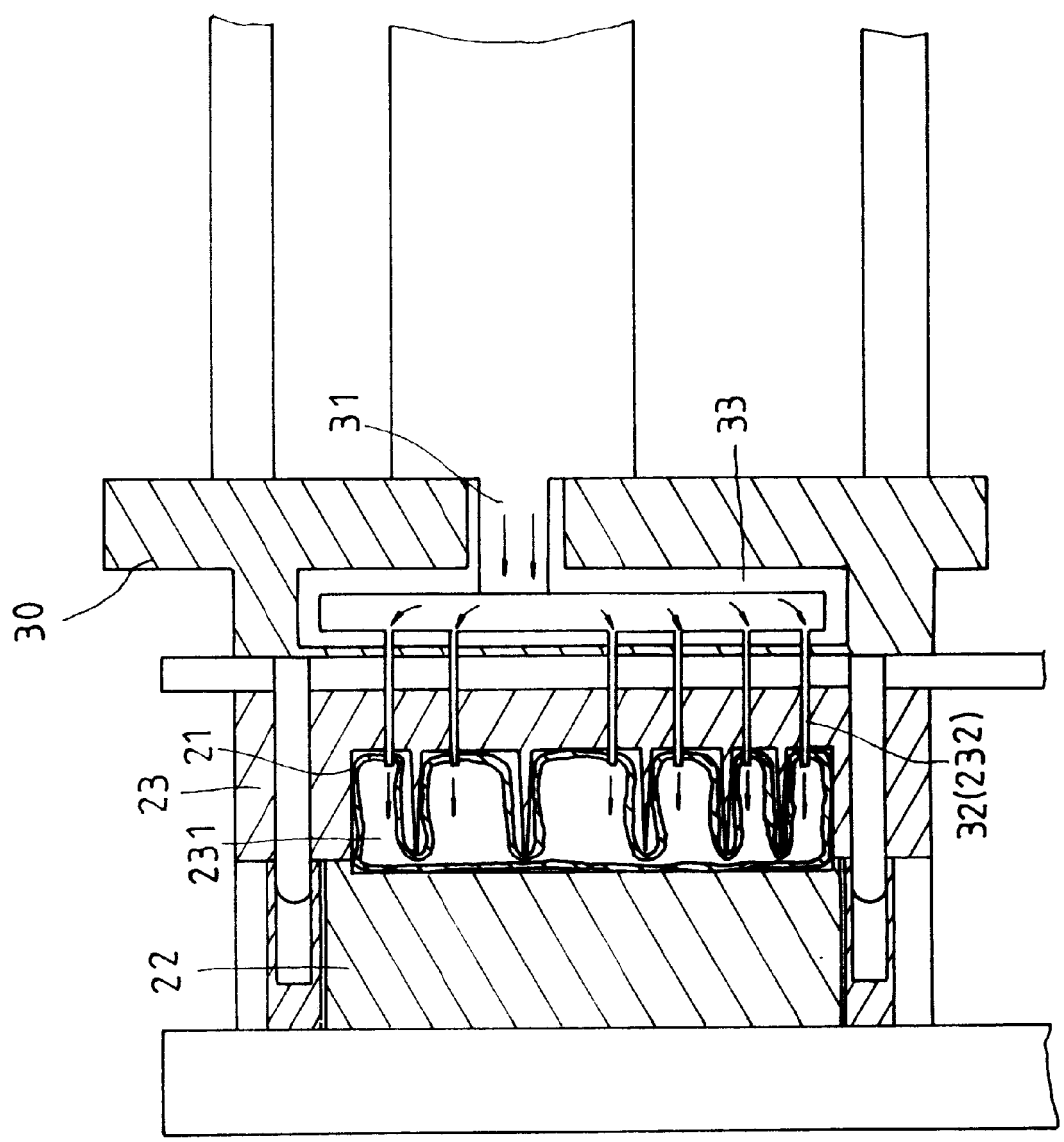
FIG. 5 shows the third process of manufacturing the present invention.
Figure 6:
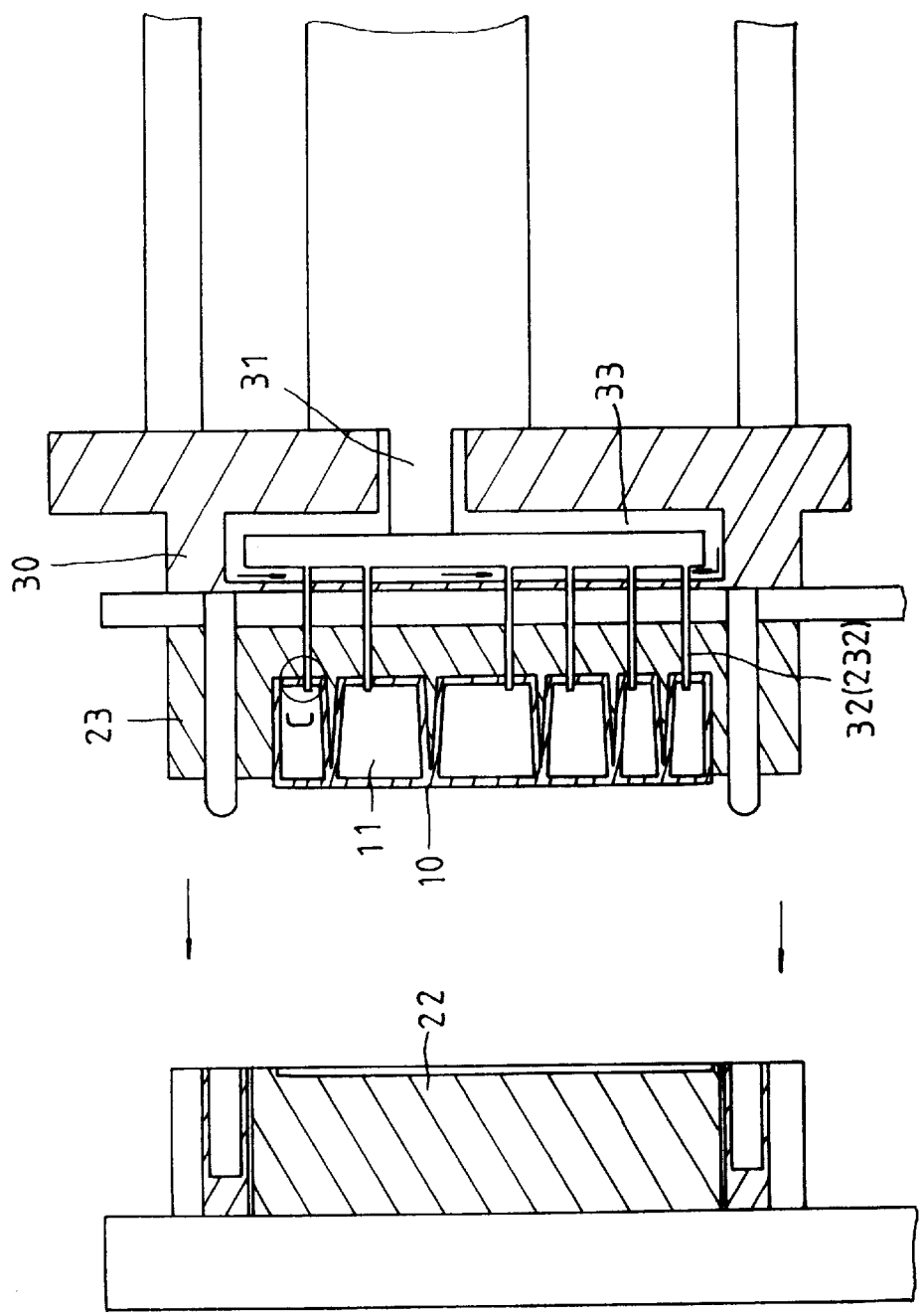
FIG. 6 shows the fourth process of manufacturing the present invention.
Figure 7:
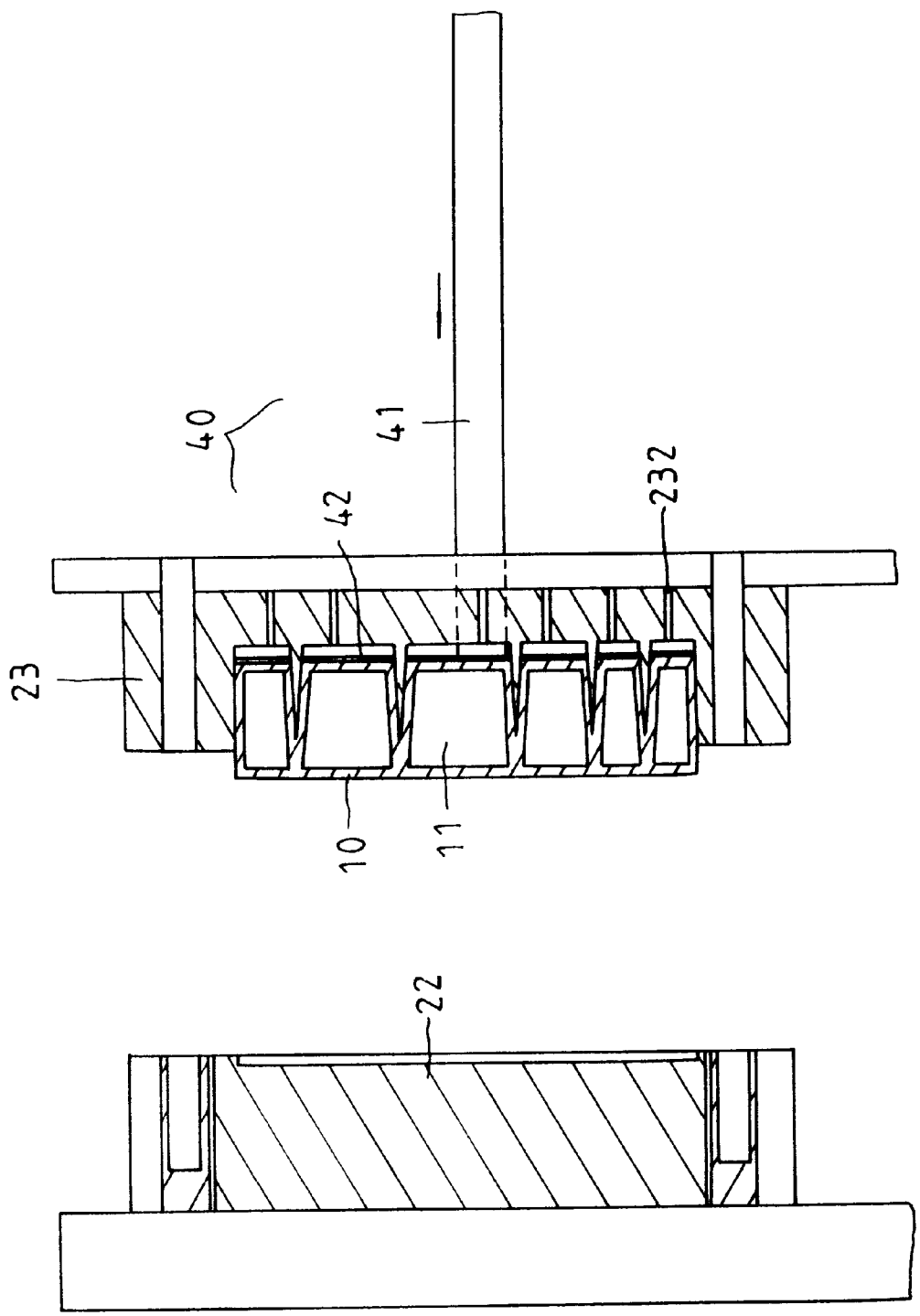

The process and mechanic structure for manufacturing gas blow shaped air cushion with multiple cells of the present invention will be describer in the following. With referring to FIGS. 3~7, the feeding barrel (20) outputs a hollow plastic material (21) with proper length (as shown in FIG. 3), then the left mold (21) is combined with the right mold (23) so that the plastic material can be pressed into the cells on the right mold (23). Meanwhile, during the combining process, the heating material cutting line (24) above the Left mold (22) can be served to cut the upper end of the plastic material (21) (as shown in FIG. 4). Since the right mold (23) is installed with a plurality of independent mold cavities (231), each of the mold cavities (231) is formed with a through hole (232) and a gas blow device (30) is mounted on the right mold (23). The gas blow device (30) has an air inlet tube (31) and a plurality of gas blow tubes (32) with respect to each cell so that each gas blow tube (32) may be exactly inserted into the mold cavity (231) and then is further pricked into the hollow plastic material (21). Moreover, a thermal flow channel (33) is formed on the periphery of the air inlet tube (31) for heating the air in the air inlet tube (31) and the gas blow tube (32). Therefore, by the heat air in the gas blow tube (32), the plastic material (21) becomes smoother and then can be successfully formed with a hollow shape matching the shape of the mold cavities (231) (as shown in FIG. 5). When each cell (11) in the air cushion (10) has been blown, the gas blow tube (32) in the gas blow device (30) will be pulled from the cells (11) of the shaping air cushion (10). Since heating air is in the gas blow tube (32), when the gas blow tube (32) is pulled out, the mouth for blowing air will be fused so as to be tightly sealed the hollow space in the plastic material (as shown in FIG. 6). After shaping, the left mold (22) will separate with the right mold (23), then the oil press cylinder (41) of the ejecting device (40) and the electing plate (42) installed in the mold cavities (231) to eject the shaped air cushion (10) (as shown in FIG. 7). Finally, a finishing work for smoothing the edge is performed and the whole process of gas blowing shaping is completed.

What is claimed is:

1. A gas blow shaped air cushion with multiple cells, wherein the air cushion is formed by a gas blowing shaping method, the gas blow shaped air cushion with multiple cells is formed by an air cushion with a plurality of independent cells, each two cells are retained with a gap, each of the cells has a spacing for elastic deformation, wherein the air cushion is formed by blowing air through an air inlet tube and a plurality of gas blow tubes with respect to each said cell so as to be inserted into mold cavities of a mold, a thermal flow channel is formed on a periphery of the air inlet tube for heating the air in the air inlet tube and the gas blow tube, by the heat air in the gas blow tube, when the gas has been blown into the air cushion, a mouth for blowing air will be fused so as to be tightly sealed a hollow space in the air cushion.

2. The gas blow shaped air cushion with multiple cells as claimed in claim 1, wherein a plastic film with a layer of beautiful colored texture is adhered to the surface of the air cushion.

* * * * *